United States Patent [19]

Chuang et al.

[11] Patent Number: 5,367,648

[45] Date of Patent: Nov. 22, 1994

[54] GENERAL PURPOSE MEMORY ACCESS SCHEME USING REGISTER-INDIRECT MODE

[75] Inventors: Chiao-Mei Chuang, Briarcliff Manor; Kemal Ebcioglu, Somers, both of N.Y.

[73] Assignee: International Business Machines Corporation, Armonk, N.Y.

[21] Appl. No.: 659,717

[22] Filed: Feb. 20, 1991

[51] Int. Cl.[5] .................... G06F 9/34; G06F 12/00; G06F 15/76

[52] U.S. Cl. ............................. 395/375; 395/400; 395/425; 395/800; 364/247; 364/247.2; 364/255.1; 364/DIG. 1

[58] Field of Search ............... 395/375, 400, 800, 425

[56] References Cited

U.S. PATENT DOCUMENTS

| | | | |
|---|---|---|---|
| Re. 34,052 | 9/1992 | Hester et al. | 395/375 |
| 4,056,819 | 11/1977 | Lukas | 395/400 X |
| 4,075,688 | 2/1978 | Lynch, Jr. et al. | 395/800 |
| 4,208,716 | 6/1980 | Porter et al. | 395/425 |
| 4,241,397 | 12/1980 | Strecker et al. | 395/375 |
| 4,245,304 | 1/1981 | Porter et al. | 395/425 |
| 4,339,793 | 7/1982 | Marenin | 395/775 |
| 4,339,796 | 7/1982 | Brereton et al. | 395/375 |
| 4,403,284 | 9/1983 | Sacarisen et al. | 395/800 |
| 4,532,587 | 7/1985 | Roskell et al. | 395/800 |
| 4,758,978 | 7/1988 | Cruess et al. | 395/375 |
| 4,766,566 | 8/1988 | Chuang | 395/375 |
| 4,907,147 | 3/1990 | Saito et al. | 395/375 |
| 4,912,636 | 3/1990 | Magar et al. | 395/425 |
| 4,935,867 | 6/1990 | Wang et al. | 395/400 |
| 5,050,068 | 9/1991 | Dollas et al. | 395/375 |
| 5,131,086 | 7/1992 | Circello et al. | 395/375 |
| 5,175,863 | 12/1992 | Jones, Jr. | 395/800 |
| 5,222,240 | 6/1993 | Patel | 395/775 |
| 5,276,820 | 1/1994 | Ikenaga et al. | 395/375 |

FOREIGN PATENT DOCUMENTS

| | | |
|---|---|---|
| 211487 | 2/1987 | European Pat. Off. . |
| 0328422 | 2/1989 | European Pat. Off. . |

OTHER PUBLICATIONS

Angiulli, J. M. et al. "Enhancements in Implementing Load Address." *IBM Technical Disclosure Bulletin*, vol. 23, No. 6, Nov. 1980, pp. 2401-2403.

*Primary Examiner*—Rebecca L. Rudolph
*Assistant Examiner*—Michael A. Whitefield
*Attorney, Agent, or Firm*—Robert P. Tassinari, Jr.

[57] ABSTRACT

A memory access scheme achieved using a memory address register and a register-indirect memory accessing mode eliminates write back collisions, long cycle time, and enhances system performance. During memory address generation operations, an arithmetic-logic unit (ALU) generates memory addresses from data in a general purpose register (GPR). Then, the memory addresses are written back to the GPR and a memory address register (MAR). During memory access operations, the MAR is accessed for the memory addresses to access a memory. Two approaches are provided. In a first approach, use of the MAR during the memory access operations is explicit. In a second approach, use of the MAR during the memory access operations is transparent. According to the second approach, a controller is provided to validate the MAR during the memory access operations.

35 Claims, 10 Drawing Sheets

GENERAL PURPOSE MEMORY ACCESS SCHEME USING REGISTER-INDIRECT MODE

BACKGROUND OF THE INVENTION

1. Field Of The Invention

The present invention relates generally to a memory access scheme for computer systems, and more particularly to a memory access scheme which is achieved using a memory address register and a register-indirect memory accessing mode.

2. Related Art

In many conventional computer systems, memory address generation is performed as part of memory access instructions, such as memory load and store instructions. An example of a conventional computer system with multiple functional units having simultaneous multiple operations is shown in FIG. 1. Specifically, FIG. 1 illustrates a computer subsystem 102 where memory address generation is performed as part of memory access instructions.

The computer subsystem 102 contains a processing unit 104 and a memory unit 134. The processing unit 104 contains multiple general purpose registers (GPR) 106, each of which are connected to an adder 108 for address generation and an arithmetic-logic unit (ALU) 110. An output 126 from the ALU 110 can be transferred (or written back) to the GPRs 106 via line 142. Addresses generated by the adder 108 are transferred to a memory 136 contained in the memory unit 134. Data is transferred between the GPR 106 and the memory 136 via the ALU 110 side of the processing unit 104. That is, data is transferred from the GPR 106 to the memory 136 via the ALU 110. Data is transferred from the memory 136 to the GPRs 106 via a bus 112, an ALU out register 138 (which is associated with the ALU 110), and a line 142.

FIG. 2 illustrates a pipelined timing diagram of the computer subsystem 102 where a memory load instruction 202 starts at time $t_0$ and a register-to-register instruction 212 starts at time $t_1$.

The memory load instruction 202 operates as follows. After an instruction fetch cycle 204, a memory address is calculated in the adder 108 during a decode/address generation cycle 206. The memory address is transferred to the memory 136. During a memory access cycle 208, the memory 136 retrieves data (according to the memory address) and places the data in the ALU out register 138. During a write back cycle 210, the data in the ALU out register 138 is written back to the GPRs 106 via the line 142.

The register-to-register instruction 212 operates as follows. After an instruction fetch cycle 214, data from the GPRs 106 is manipulated in the ALU 110 to produce an arithmetic/logic result during an decode/execute cycle 216. During a write back cycle 218, the arithmetic/logic result is written back to the GPRs 106 via the line 142.

Because the memory load instruction 202 contains an additional memory access cycle 208, an uneven pipeline is created. That is, the memory load instruction 202 (and memory access instructions in general) takes one more cycle to execute than the register-to-register instruction 212. As a result of the uneven pipeline, both the memory load instruction 202 and the register-to-register instruction 212 attempt to write back to the GPRs 106 via the line 142 during the same cycle (that is, the cycle beginning at $t_3$). Therefore, "write back" collisions occur in computer systems where memory address generation is performed as part of the memory access instructions. Such write back collisions degrade processor performance.

In a first prior solution to the write back collision problem, register instructions are extended by 1 cycle. This is illustrated by the timing diagram in FIG. 3, wherein a register-to-register instruction 302 contains an wait cycle 304, in addition to the instruction fetch cycle 214, the decode/execute cycle 216, and the write back cycle 218. The addition of the wait cycle 304 eliminates write back collisions by eliminating the uneven pipeline. However, the addition of wait cycles 304 increases pipeline penalties. Consequently, this solution is flawed because it decreases system performance.

In a second prior solution to the write back collision problem, memory access instructions are executed as 2 cycle instructions. This is illustrated by the timing diagram in FIG. 4, where the start of a register-to-register instruction 402 is delay by one cycle to $t_2$. While eliminating write back collisions, this solution causes the memory access instructions to effectively execute in 2 cycles, rather than 1 cycle. Thus, this solution is flawed because it decreases system performance.

In a third prior solution to the write back collision problem, an additional GPR write port is added for use during write back cycles. Referring to FIG. 1, an additional GPR write port is added to facilitate a separate path between the GPR 106 and the memory 136. The separate path, working in conjunction with the existing path formed by line 142, eliminates write back collisions. However, this solution significantly increases the hardware costs in computer systems with multiple functional units. Specifically, if a system has N functional units and W write ports per functional unit, then $W*N^2$ input ports to the GPR 106 are required (if the GPR 106 is partitioned and replicated). Thus, this solution is flawed because it increases the cost of computer systems.

In a fourth prior solution to the write back collision problem, memory address generation is performed in separate instructions, apart from memory access instructions. Performing memory address generation in separate instructions does not have an adverse affect on system performance in computer systems with multiple functional units. The fourth solution is illustrated by the timing diagram in FIG. 5, where an address generation instruction 502 begins at $t_0$, a memory load instruction 510 begins at $t_1$, and a register-to-register instruction 518 beings at $t_2$.

The operation of the address generation instruction 502 and the register-to-register instruction 518 is similar to the operation of the register-to-register instruction 212. In particular, the address generation instruction 502, after generating an address during a decode/execute cycle 506, writes back the address to the GPR 106 during a write back cycle 508.

The operation of the memory load instruction 510 is similar to the operation of the memory load instruction 202. Unlike the memory load instruction 202, however, the memory load instruction 510 does not perform address generation. Instead, the memory load instruction 510 accesses the GPR 106 for the address generated by the address generation instruction 502. The memory load instruction 510 then uses the address to access the memory 136. The memory load instruction performs these two operations during a decode/memory access (GPR) cycle 514 (the "(GPR)" indicates that the address comes from the GPR 106).

Because address generation is not performed in memory access instructions 510, the fourth solution eliminates uneven pipelines and thus eliminates write back collisions.

However, the fourth solution is inefficient because the path length associated with the decode/memory access (GPR) cycle 514 is much longer than the path length associated with the decode/execute cycle 522. In other words, the fourth solution creates an unbalanced pipeline partition because some cycles take significantly longer to execute than other cycles. Thus, the fourth solution is flawed because it results in a much longer cycle time (since cycle time is determined by the longest pipeline path).

Specifically, the decode/memory access (GPR) cycle 514 involves (1) processing time to access the GPR 106 to retrieve the address generated during the address generation instruction 502, (2) propagation delay to send the address from the GPR 106 to the memory 136, (3) memory read latency delay associated with reading the memory 136, and (4) propagation delay to send data from the memory 136 to the ALU out register 138.

In contrast, the decode/execute cycle 522 involves only (1) processing time to access the GPR 106 to retrieve data for the register-to-register instruction 518, and (2) processing time of the ALU 110.

The processing time disparity between the decode/memory access (GPR) cycle 514 and the decode/execute cycle 522 is greater if the processing unit 104 and the memory unit 134 are located on separate chips or circuit boards. The processing unit 104 and the memory unit 134 are likely to be located on separate chips or circuit boards if the processing unit 104 contains multiple functional units.

Uneven pipeline creates additional problems for very long instruction word (VLIW) machines. A VLIW machine contains multiple functional units. The functional units execute multiple operations in parallel and in lock step according to very long instruction words. Since all pipeline interlocks and parallelism extraction are managed by a compiler, the uneven pipeline or long pipeline that is presented to the compiler would significantly complicate the compiler's task.

Therefore, a memory access scheme is required which achieves an uniform pipeline without increasing cycle time.

SUMMARY OF THE INVENTION

The present invention is directed to a memory access scheme which is achieved using a memory address register and a register-indirect memory accessing mode, such that an uniform and short pipeline having a short cycle time are achieved and system performance is enhanced. The memory access scheme operates with a computer system that has a general purpose register (GPR), one or more memory address registers (MAR), one or more arithmetic logic units (ALU), and a memory.

According to the present invention, during memory address generation operations, the ALU generates memory addresses from data in the GPR. Then, the memory addresses are written back to the GPR and MAR.

During memory access operations, the MAR is accessed for the memory addresses. Then, the memory addresses from the MAR are used to access the memory.

The GPR and ALU may be located on a first circuit board and the MAR and memory may be located on a second circuit board.

Alternatively, the memory access scheme of the present invention operates with a computer system that has a general purpose register (GPR), one or more memory address registers (MAR), one or more arithmetic logic units (ALU), a multiplexer, a controller, and a memory.

During memory address generation operations, the ALU generates memory addresses from data in the GPR. Then, the memory addresses are written back to the GPR and MAR.

During memory access operations, the MAR is accessed for the memory addresses. Then, the memory addresses from the MAR are used to access the memory. Also, the controller validates the memory addresses in the MAR. The memory accesses are valid if the memory addresses in the MAR are valid.

However, if the memory addresses in the MAR are not valid, then the controller transfers valid memory addresses from the GPR to the MAR via the multiplexer. Then, the memory is accessed again using the memory addresses in the MAR.

Preferably, the controller validates the memory addresses contained in the MAR by (1) identifying a source register of a current memory access operation; (2) identifying a destination register of an immediately preceding memory address generation operation; and (3) comparing the source register and destination register. If the source and destination registers are the same, then the MAR is valid, Otherwise, the MAR is invalid.

The structure and operation of various embodiments of the present invention are described in detail below with reference to the accompanying drawings, and in the claims. In the drawings, like reference numbers indicate identical or functionally similar elements.

BRIEF DESCRIPTION OF THE DRAWINGS

The present invention will be described with reference to the accompanying drawings, wherein.

DETAILED DESCRIPTION OF THE PREFERRED EMBODIMENTS

The present invention is directed to a system and method for accessing memory in computer systems. In particular, the present invention is directed to a memory access scheme which is achieved using a memory address register and a register-indirect memory accessing mode, such that an uniform and short pipeline having a short cycle time are achieved and system performance is enhanced.

According to the present invention, memory address generation is performed in separate operations, apart from memory access operations. To access a memory, two operations are executed in sequence. First, a memory address generation operation is executed. Second, a memory access operation is executed.

During the memory address generation operation, address data from a general purpose register (GPR) is used to generate a memory address. Then, the memory address is written back to the GPR. In addition, the memory address is stored in a memory address register (MAR). The MAR and memory are located on the same circuit board. The MAR and memory may be located on the same chip.

During the memory access operation, the GPR is not accessed for immediate memory access (although the GPR is accessed for the memory address if the memory address contained in the MAR is incorrect). Instead, the MAR is accessed for the memory address. The memory address is used to read from or write to the memory. Because the MAR and GPR are accessed for the memory address, the present invention implements a memory access scheme using a register-indirect mode.

Because memory address generation is performed in a separate operation, the present invention eliminates uneven pipelines and thus eliminates write back conflicts. Because the MAR is accessed for memory addresses during memory access operations, rather than the GPR, the present invention achieves a balanced pipeline partition by eliminating uneven path lengths between decode/execute cycles and decode/memory access cycles, thereby preventing long cycle times.

The structure and operation of the present invention will now be described in detail.

Figure 1:
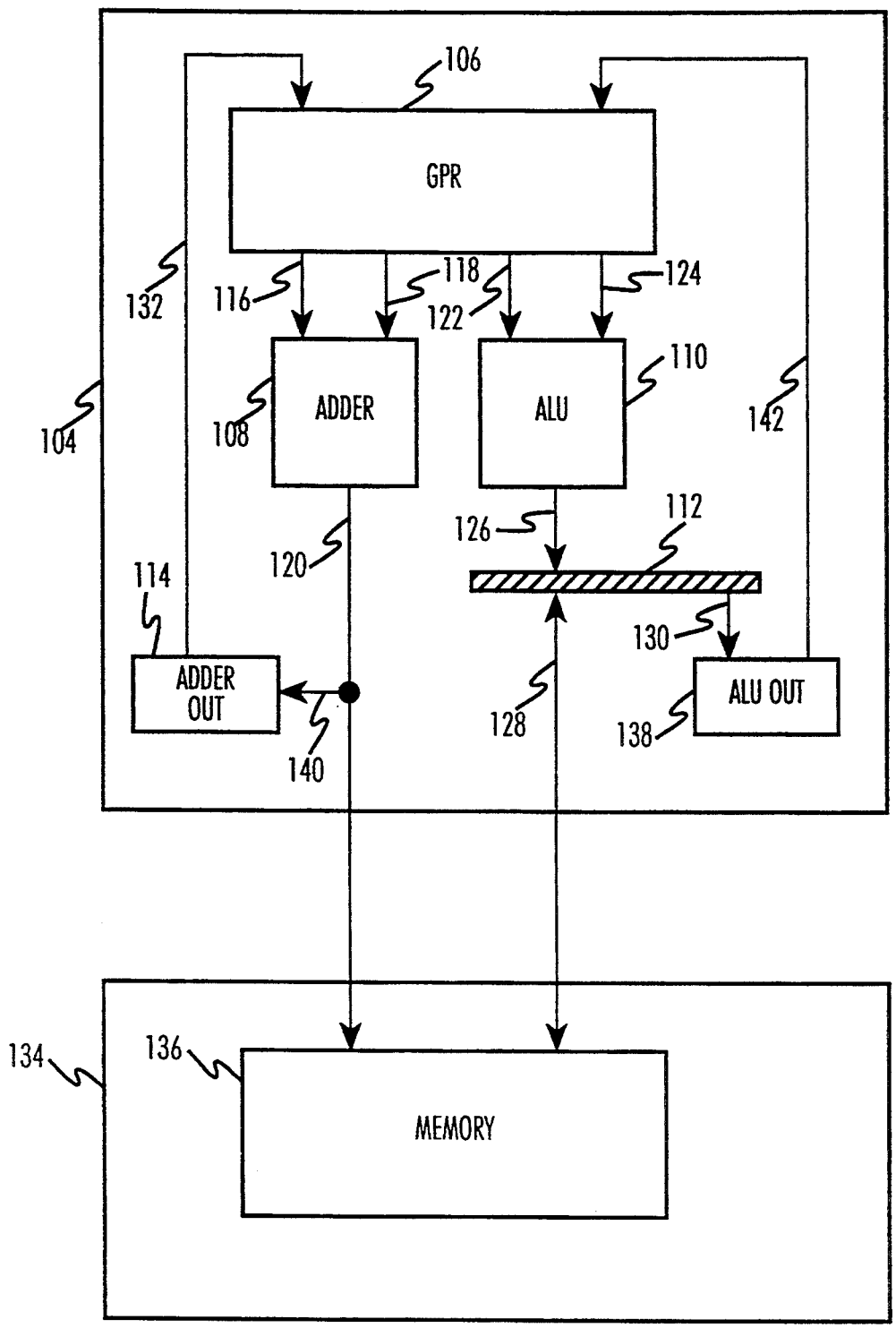
FIG. 1 illustrates a computer subsystem where memory address generation is performed as part of memory access instructions.
Figure 2:
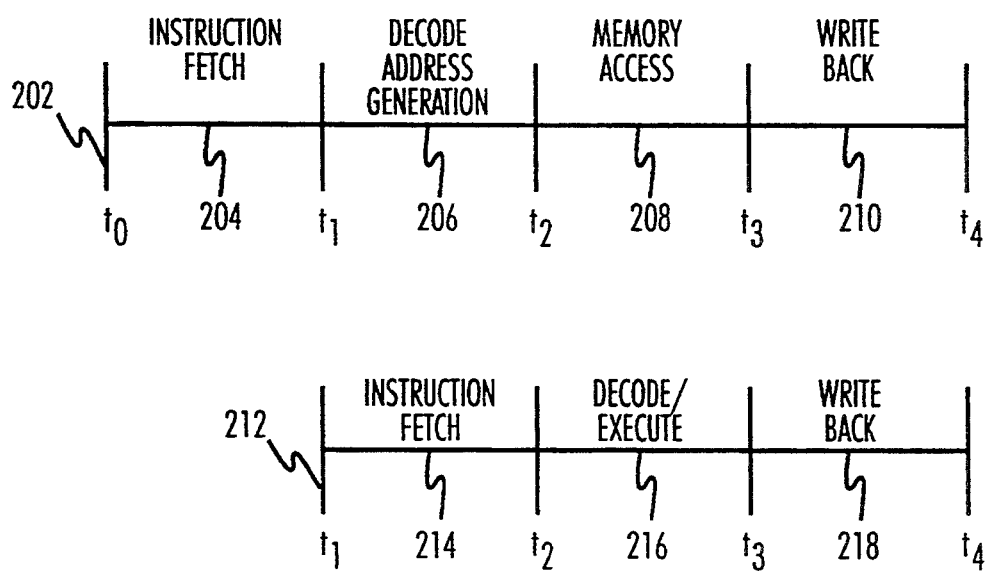
FIG. 2 illustrates a first pipelined timing diagram for the computer subsystem shown in FIG. 1.
Figure 3:
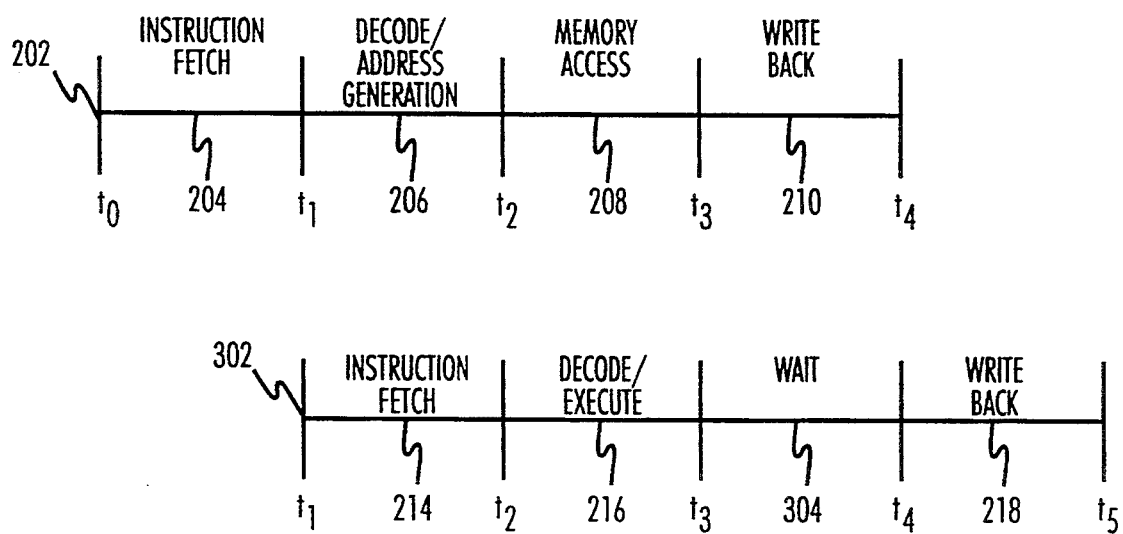
FIG. 3 illustrates a second pipelined timing diagram for the computer subsystem shown in FIG. 1.
Figure 4:
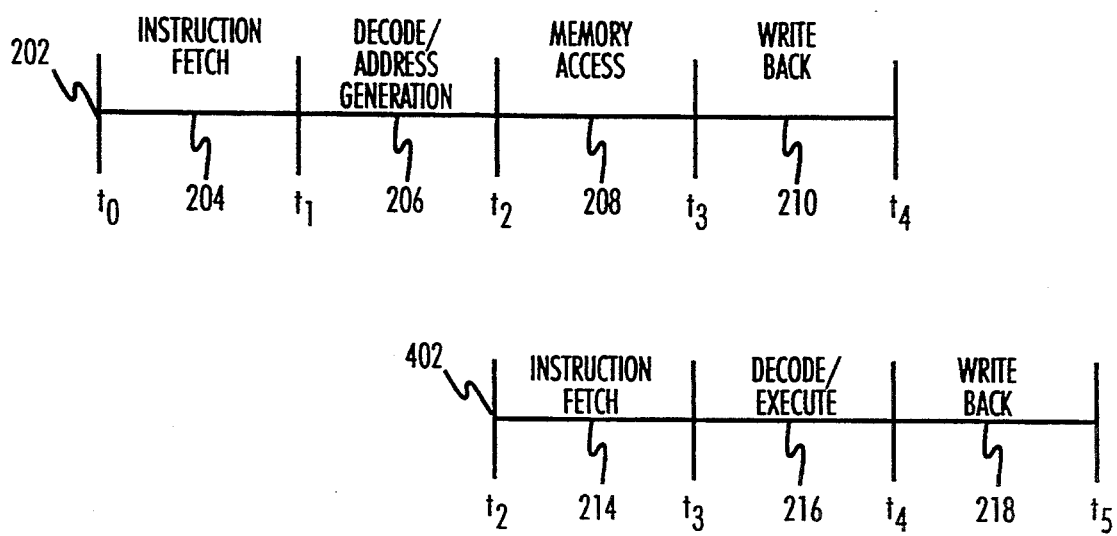
FIG. 4 illustrates a third pipelined timing diagram for the computer subsystem shown in FIG. 1.
Figure 5:
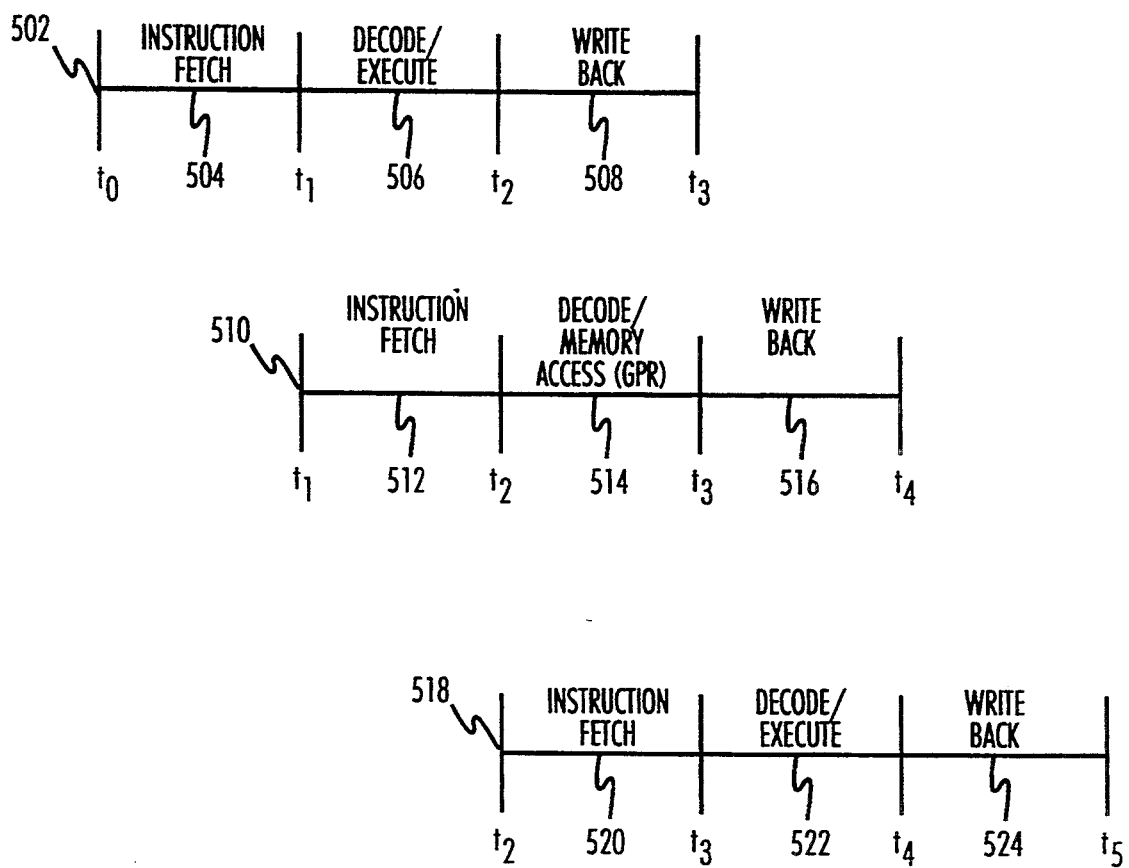
FIG. 5 illustrates a fourth pipelined timing diagram for the computer subsystem shown in FIG. 1.
Figure 6:
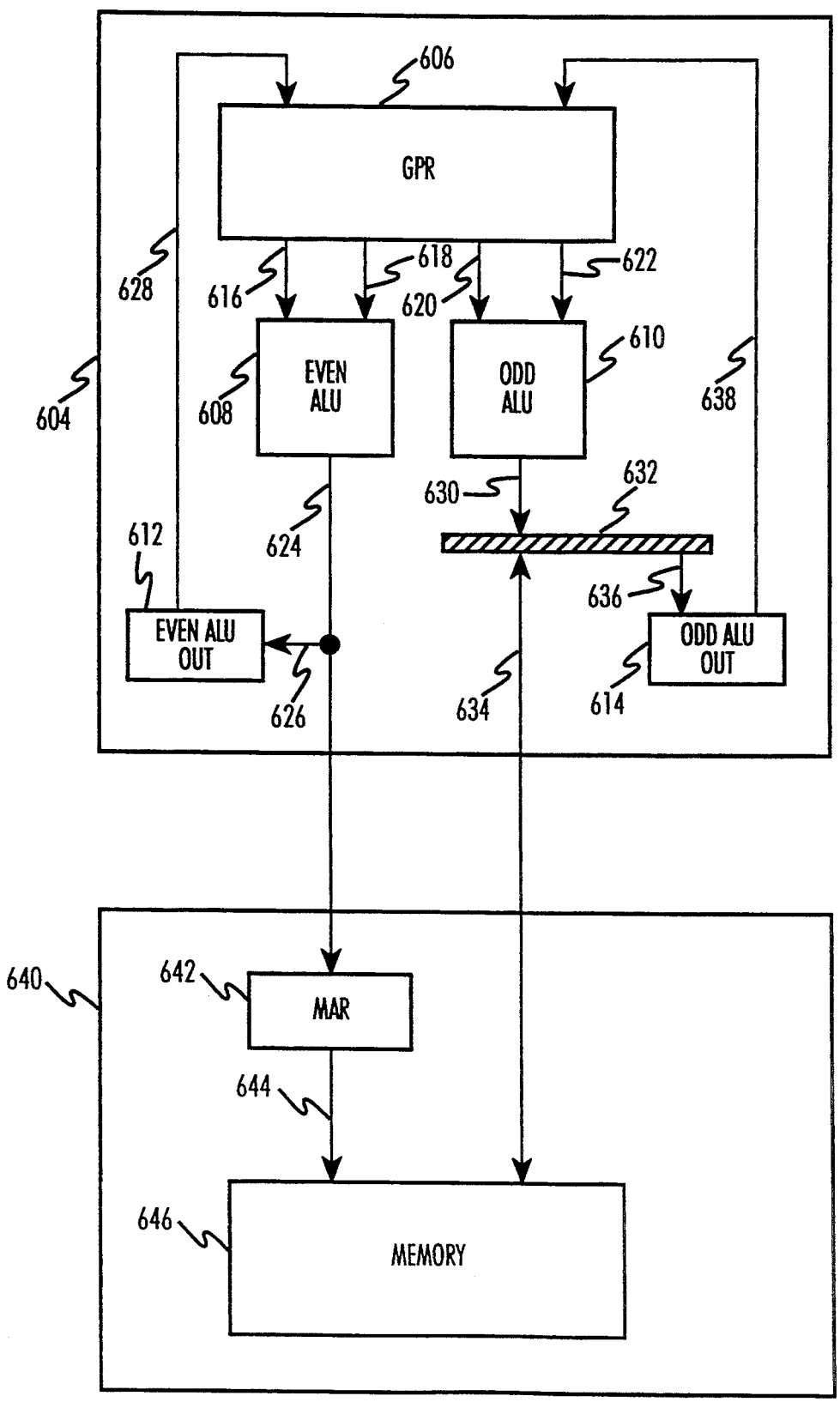
FIG. 6 presents a structural diagram of a first embodiment of the present invention.

FIG. 6 presents a structural diagram of a first embodiment of the present invention. According to the first embodiment, the features and advantages of the present invention are achieved using a memory address register (MAR) which is architecturally visible to computer software. Thus, the first embodiment of the present invention is also referred to as an architectured MAR embodiment.

The present invention as illustrated in FIG. 6 represents a subsystem 602 of a computer system. In the preferred embodiment of the present invention, the computer system is a superscalar computer or a very long instruction word (VLIW) computer. The VLIW computer includes multiple functional units. The functional units execute in parallel according to very long instruction words. Specifically, the very long instruction words contain fields which control the functional units. Thus, in the timing diagrams associated with the preferred embodiment of the present invention (shown in FIGS. 7, 9, and 10), the operations (such as operations 702, 710, and 718 in FIG. 7) represent only a part of the very long instruction words.

The subsystem 602 contains a processing unit 604 and a memory unit 640. The processing unit 604 and the memory unit 640 may be located on separate chips and/or separate circuit boards.

The processing unit 604 contains a general purpose register (GPR) 606, an even arithmetic logic unit (ALU) 608, an odd ALU 610, an even ALU out register 612, a bus 632, and an odd ALU out register 614. Although not explicitly shown in FIG. 6, the processing unit 604 may contain multiple even ALUs 608, odd ALUs 610, even ALU out registers 612, buses 632, and odd ALU out registers 614.

The GPR 606 contains multiple registers. In the preferred embodiment of the present invention, the GPR 606 contains 128 registers. At any time, two of the general purpose registers (GPRs) 606 can be connected to the even ALU 608 via lines 616, 618. Similarly, two of the GPRs 606 can be connected to the odd ALU 610 via lines 620, 622.

Address generation operations and register-to-register operations are performed in the even ALU 608. Results from the even ALU 608 are stored in the even ALU out register 612. From the even ALU out register 612, the results from the even ALU 608 are written back to one of the GPRs 606 via line 628.

Results from the odd ALU 610 are stored in the odd ALU out register 614 via bus 632 and line 636. From the odd ALU out register 614, the results from the odd ALU 610 are written back to one of the GPRs 606 via line 638.

The memory unit 640 contains a memory address register (MAR) 642 and a memory 646. The MAR 642 stores memory addresses for use by memory access operations to access the memory 646. Memory addresses are sent from the even ALU 608 to the MAR 642 on line 624, as the result of memory address generation operations.

The memory 646 receives memory addresses from the MAR 642 on line 644. During memory store operations, the memory 646 receives data from the odd ALU 610 via line 630, bus 632, and line 634. During memory load operations, the memory 646 sends data to the odd ALU out register 614 via line 634, bus 632, and line 636. For both memory store operations and memory load operations, the memory 646 receives memory addresses from the MAR 642 in the same manner. Since they do not directly impact system performance, memory store operations can be buffered until the correctness of the MAR 642 is resolved. Thus, the operation of the first embodiment of the present invention will be described with reference to memory load operations.

Figure 7:
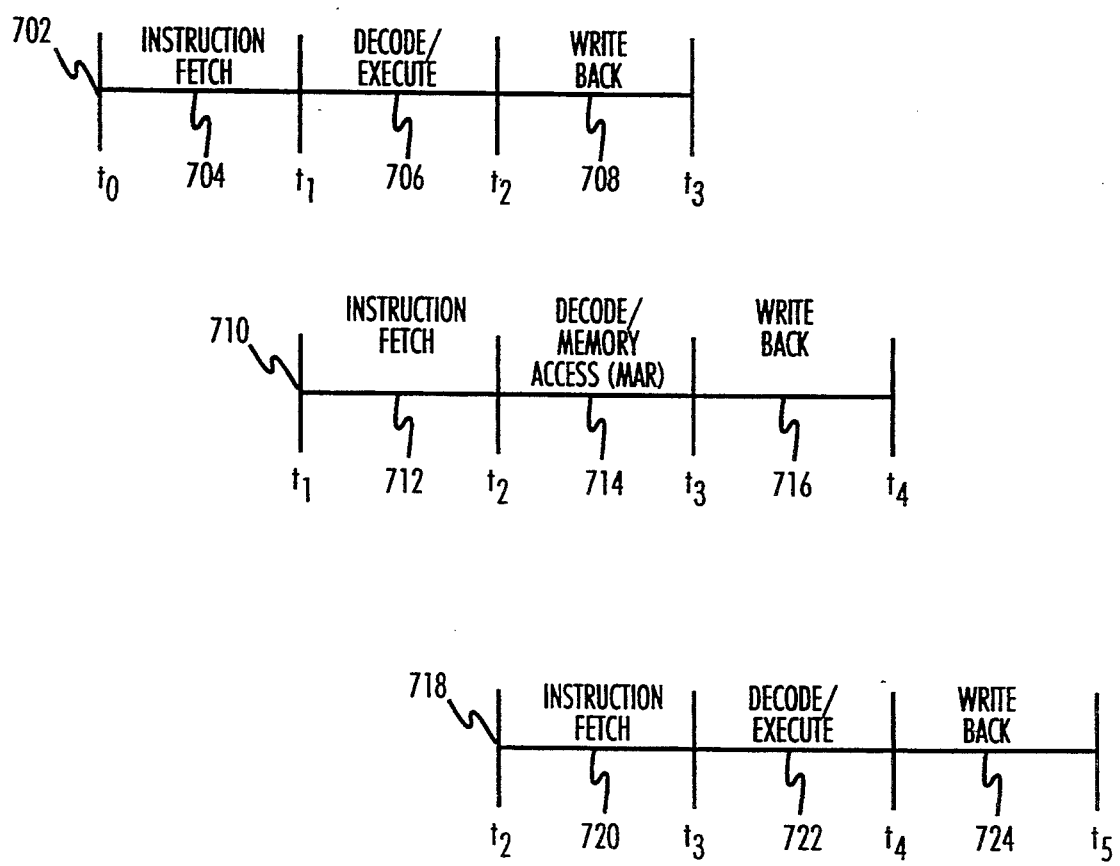
FIG. 7 illustrates a pipelined timing diagram for the first embodiment of the present invention.

The operation of the first embodiment of the present invention will now be described with reference to the pipelined timing diagram in FIG. 7. The timing diagram in FIG. 7 shows a memory address generation operation 702 starting at $t_0$, a memory load operation 710 starting at $t_1$, and a register-to-register operation 718 starting at $t_2$.

The operation of the memory address generation operation 702 will now be described.

During an instruction fetch cycle 704, the memory address generation operation 702 is retrieved from an instruction memory (not shown in FIG. 6).

During a decode/execute cycle 706, address data is transferred from the GPR 606 to the even ALU 608 on lines 616, 618. The even ALU 608 manipulates the address data in a manner specified by the memory address generation operation 702 to generate a memory address. For example, the even ALU 608 may add, multiply, AND, or shift the address data to generate the memory address. Then, the memory address is stored in the even ALU out register 612. In addition, the memory address is stored in the MAR 642.

During a write back cycle 708, the result in the even ALU out register 612 is written back to one of the GPRs 606 (if so specified by the memory address generation operation 702).

Assume R1, R2, and R3 are GPRs 606. Also assume that R1 and R2 contain the address data and the address data are added together to generate the memory address during the decode/execute cycle 706. Further assume that the memory address is written back to R3 during the write back cycle 708. With these assumptions, it is possible to represent the operation of the present invention during the memory address generation operation 702 with the following instruction, wherein the MAR 642 is explicitly recited.

MAR, R3←R1+R2  (Statement 1)

The memory address generation operation 702 is also called a Load MAR operation 702. The Load MAR operation 702 can be implemented as a new operation. Otherwise, the Load MAR operation 702 can be implemented as a register-to-register operation by adding a MAR flag bit to the register-to-register operation format. The MAR flag bit indicates whether or not the memory address is to be stored in the MAR 642 at the end of the decode/execute cycle 706. Thus, the address on line 624 is only latched into the MAR 642 if the MAR 642 is explicitly listed in the instruction (such as shown in Statement 1). In the preferred embodiment, the address on line 624 is only latched into the MAR 642 if the MAR flag bit is set.

The operation of the memory load operation 710 will now be described.

During an instruction fetch cycle 712, the memory load operation 710 is retrieved from the operation memory.

At the beginning of a memory access (MAR) cycle 714, the MAR 642 is accessed for the memory address. The memory address was placed in the MAR 642 at the end of the decode/execute cycle 706 of the memory address generation operation 702. Then, the memory address from the MAR 642 is used to access and retrieve data from the memory 646. Then, the accessed data is transferred from the memory 646 to the odd ALU out register 614 via line 634, bus 632, and line 636.

During a write back cycle 716, the data in the odd ALU out register 614 is written back to one of the GPRs 606 on line 638 as specified by the memory load operation 710.

Assume that R4 is a GPR 606. Further assume that the data is written back to R4 during the write back cycle 716. With these assumptions, it is possible to represent the operation of the present invention during the memory load operation 710 with the following instruction, wherein the MAR 642 is explicitly recited.

R4←(MAR)  (Statement 2)

The operation of the register-to-register operation 718 will now be described.

During an instruction fetch cycle 720, the register-to-register operation 718 is retrieved from the instruction memory.

During a decode/execute cycle 722, data is transferred from the GPR 606 to the even ALU 608 or the odd ALU 610, as specified by the register-to-register operation 718. The appropriate ALU 608, 610 manipulates the data in a manner specified by the register-to-register operation 718 to generate a result. For example, the appropriate ALU 608, 610 may add, multiply, AND, or shift the data to generate the result. Then, the result is stored in the appropriate ALU out register 612, 614 (if the Load MAR operation is implemented as a register-to-register operation, then in the register-to-register operation 718 the MAR flag bit would be set to indicate that the result should not be stored in the MAR 642).

During a write back cycle 724, the result in the appropriate ALU out register 612, 614 is written back to one of the GPRs 606 as specified by the register-to-register operation 718.

As explained above, the memory address generation operation 702 explicitly stores a memory address in the MAR 642. The memory load operation 710 explicitly accesses the MAR 642 for the memory address. Thus, it is clear that the first embodiment of the present invention is architecturally visible to computer software since computer software must explicitly operate with the MAR 642.

As evident by the timing diagram in FIG. 7, the present invention eliminates uneven pipelines (and thus eliminates write back conflicts) by performing address generation in a separate operation (that is, the Load MAR operation 702).

Also, the present invention avoids long cycle times by accessing the MAR 642 (rather than the GPR 606) for memory addresses during memory access operations. The use of the MAR 642 in this manner ensures that the decode/memory access (MAR) cycle 714 of the memory load operation 710 takes approximately the same time to complete as the decode/execute cycle 706 of the Load MAR operation 702.

Specifically, the decode/memory access (MAR) cycle 714 involves (1) processing time to retrieve the memory address in the MAR 642 (the memory address was placed in the MAR 642 during the Load MAR operation 702), (2) memory read latency delay associated with reading data from the memory 646 according to the memory address, and (3) propagation delay to send the data from the memory 646 to the odd ALU out register 614 via line 634, bus 632, and line 636.

The decode/execute cycle 706 involves (1) processing time to access the GPR 606 to retrieve data for the Load MAR operation 702, (2) processing time of the even ALU 608, and (3) propagation delay to send the memory address from the even ALU 608 to the MAR 642 via line 624.

In practice, the processing time is approximately the same for both the decode/memory access (MAR) cycle 714 and the decode/execute cycle 706.

Because the processing time is approximately the same for both the decode/memory access (GPR) cycle 714 and the decode/execute cycle 706, the first embodiment of the present invention provides a uniform pipeline without increasing cycle times.

The first embodiment of the present invention may include a Read MAR operation. The Read MAR operation is used to transfer the memory address in the MAR 642 to one of the GPRs 606. The Read MAR operation is useful for saving the state of the computer subsystem 602. For example, the Read MAR operation may be executed just prior to executing an interrupt service routine.

The operation of the first embodiment of the present invention is further illustrated with the following example. The left column represents operations performed by the even ALU 608, and the right column indicates operations performed by the odd ALU 610.

| | even ALU 608 | odd ALU 610 |
|---|---|---|
| i1: | MAR, R3 ← R1 + R2 | |
| i2: | MAR, R10 ← R11 + R12 | R4 ← (MAR) |
| i3: | MAR, R21 ← R22 + R23 | R10 ← (MAR) |

During 12, the result of R1+R2 is used as a memory address to access the memory 646. Similarly, during 13, the result of R11+R12 is used as a memory address to access the memory 646.

Figure 8:
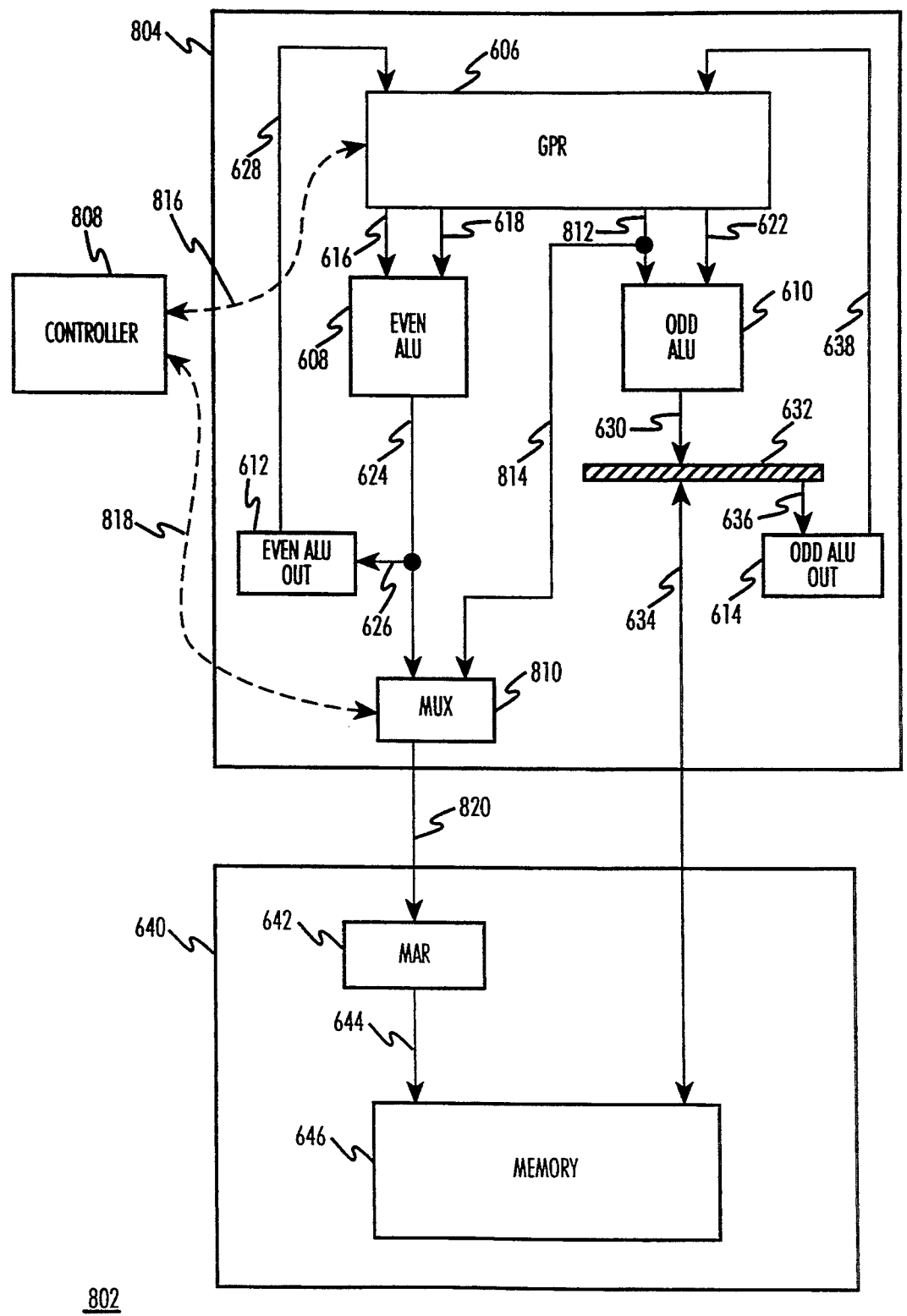
FIG. 8 presents a structural diagram of a second embodiment of the present invention.

FIG. 8 presents a structural diagram of a second embodiment of the present invention. According to the second embodiment, the features and advantages of the present invention are achieved using a memory address register (MAR) which is transparent to computer software. Thus, the second embodiment of the present invention is also referred to as a transparent MAR embodiment.

The present invention as illustrated in FIG. 8 represents a subsystem 802 of a computer system. In the preferred embodiment of the present invention, the computer system is a superscalar computer or a very long instruction word (VLIW) computer.

The subsystem 802 contains a processing unit 804, a memory unit 640, and a controller 808. The processing unit 804 and the memory unit 640 may be located on separate chips and/or separate circuit boards.

The processing unit 804 contains a general purpose register (GPR) 606, an even arithmetic logic unit (ALU) 608, an odd ALU 610, an even ALU out register 612, a bus 632, and an odd ALU out register 614. The processing unit 804 also contains a multiplexer (MUX) 810. Although not explicitly shown in FIG. 8, the processing unit 804 may contain multiple even ALUs 608, odd ALUs 610, even ALU out registers 612, buses 632, and odd ALU out registers 614.

The GPR 606 contains multiple registers. In the preferred embodiment of the present invention, the GPR 606 contains 128 registers. At any time, two of the general purpose registers (GPRs) 606 can be connected to the even ALU 608 via lines 616, 618. Similarly, two of the GPRs 606 can be connected to the odd ALU 610 via lines 812, 622.

Address generation operations and register-to-register operations are performed in the even ALU 608. Results from the even ALU 608 are stored in the even ALU out register 612. From the even ALU out register 612, the results from the even ALU 608 are written back to one of the GPRs 606 via line 628.

Results from the odd ALU 610 are stored in the odd ALU out register 614 via bus 632 and line 636. From the odd ALU out register 614, the results from the odd ALU 610 are written back to one of the GPRs via line 638.

The MUX 810 operates as a switch. Specifically, the MUX 810 determines whether the memory unit 640 receives memory addresses from the even ALU 608 or from the GPR 606.

The memory unit 640 contains a memory address register (MAR) 642 and a memory 646. The MAR 642 stores memory addresses for use by memory access operations to access the memory 646. The MAR 642 receives memory addresses from the even ALU 608 (via line 624, MUX 810, and line 820) or the GPR 606 (via line 812, line 814, MUX 810, and line 820) as determined by the MUX 810.

The memory 646 receives memory addresses from the MAR 642 on line 644. During memory store operations, the memory 646 receives data from the odd ALU 610 via line 630, bus 632, and line 634. During memory load operations, the memory 646 sends data to the odd ALU out 614 via line 634, bus 632, and line 636. For both memory store operations and memory load operations, the memory 646 receives memory addresses from the MAR 642 in the same manner. Since they do not directly impact system performance, memory store operations can be buffered until the correctness of the MAR 642 is resolved. Thus, the operation of the first embodiment of the present invention will be described with reference to memory load operations.

The controller 808 maintains control links 816, 818 with at least the GPR 606 and the MUX 810. By sending and receiving messages over the control links 816, 818, the controller 808 manages the content of the MAR 642 such that the MAR 642 contains valid memory addresses.

Figure 9:
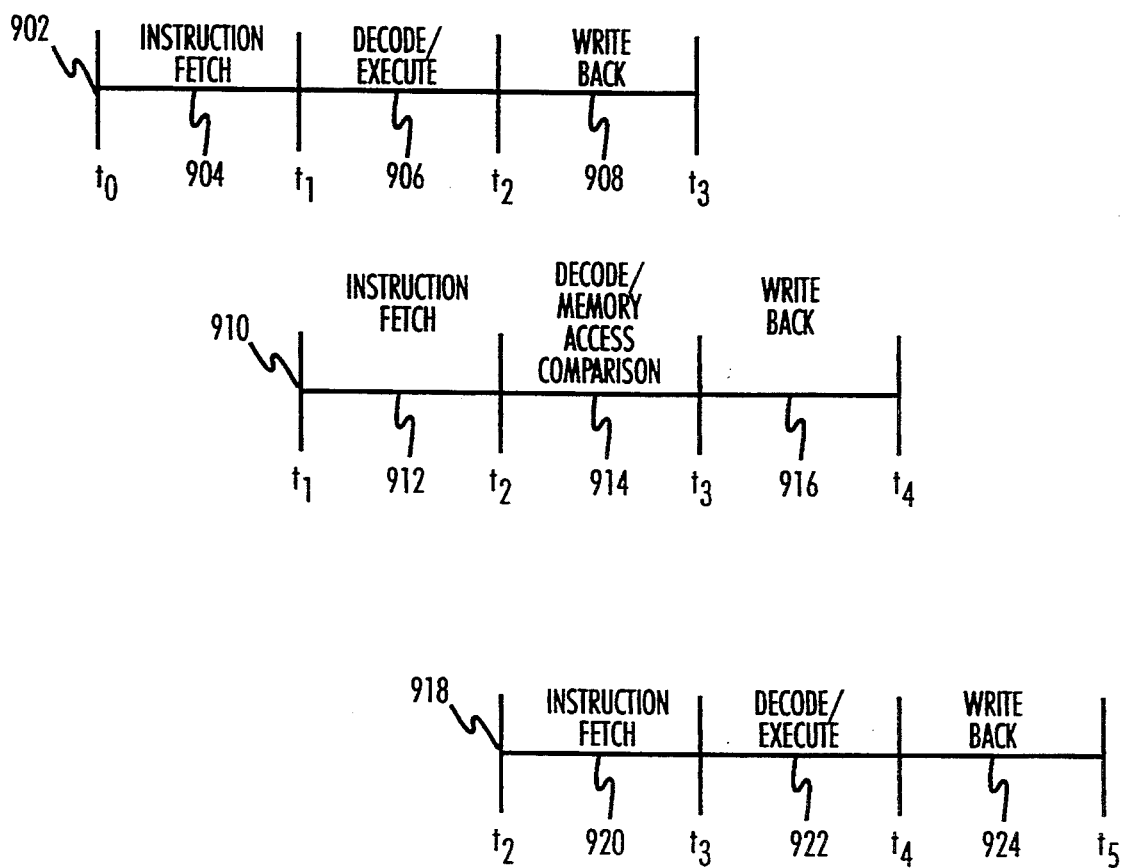
FIG. 9 illustrates a first pipelined timing diagram for the second embodiment of the present invention.

The operation of the second embodiment of the present invention will now be described with reference to the pipelined timing diagrams in FIGS. 9 and 10. Referring first to FIG. 9, the timing diagram shows a memory address generation operation 902 starting at $t_0$, a memory load operation 910 starting at $t_1$, and a register-to-register operation 918 starting at $t_2$.

The operation of the memory address generation operation 902 will now be described.

During an instruction fetch cycle 904, the memory address generation operation 902 is retrieved from an instruction memory (not shown in FIG. 8).

During a decode/execute cycle 906, address data is transferred from the GPR 606 to the even ALU 608 on lines 616, 618. The even ALU 608 manipulates the address data in a manner specified by the memory address generation operation 902 to generate a memory address. For example, the even ALU 608 may add, multiply, AND, or shift the address data to generate the memory address. Then, the memory address is stored in the even ALU out register 612. In addition, the controller 808 switches the MUX 810 such that the memory address is stored in the MAR 642.

During a write back cycle 908, the memory address in the even ALU out register 612 is written back to one of the GPRs 606 as specified by the memory address generation operation 902.

Assume R1, R2, and R3 are GPRs 606. Also assume that R1 and R2 contain the address data and the address data are added together to generate the memory address during the decode/execute cycle 906. Further assume that R3 is the target register; that is, the memory address is written back to R3 during the write back cycle 908. With these assumptions, it is possible to represent the operation of the present invention during the memory address generation operation 902 with the following instruction.

R3←R1+R2    (Statement 3)

Note that the MAR 642 is not explicitly recited in the above instruction (Statement 3). The controller 808 ensures that the memory address is stored in the MAR 642. Thus, according to the second embodiment of the present invention, computer programs are not required to explicitly recite the MAR 642 in order to store memory addresses in the MAR 642. The MAR 642 is transparent to computer programs.

The operation of the memory load operation 910 will now be described.

During an instruction fetch cycle 912, the memory load operation 910 is retrieved from the instruction memory.

At the beginning of a decode/memory access/comparision cycle 914, the MAR 642 is accessed for the memory address. Then, the memory address from the MAR 642 is used to access and retrieve data from the memory 646. Normally, the accessed data is transferred from the memory 646 to the odd ALU out register 614 via line 634, bus 632, and line 636. The accessed data is not transferred to the odd ALU out register 614 if the memory address is invalid. The process for determining the validity of the memory address is described later in this patent application.

If the memory address is valid, and thus the accessed data was transferred to the odd ALU out register 614 during the decode/memory access/comparision cycle 914, then a write back cycle 916 is performed. During the write back cycle 916, the data in the odd ALU out register 614 is written back to one of the GPRs 606 via line 638 as specified by the memory load operation 910.

Assume that R4 is a GPR 606. Further assume that the data is written back to R4 during the write back cycle 916. With these assumptions, it is possible to represent the operation of the present invention during the memory load operation 910 with the following instruction.

R4←(R3) (Statement 4)

Note that R3, rather than the MAR 642, is recited as the source register for the memory load operation 910. According to the second embodiment of the present invention, the computer subsystem 802 ensures that the MAR 642 is accessed for memory addresses during memory access operations, even though the memory access operations themselves do not explicitly recite the MAR 642. Thus, computer programs are not required to explicitly recite the MAR 642 in order to access the MAR 642 for memory addresses. The MAR 642 is transparent to computer programs.

During the decode/memory access/comparison cycle 914, the controller 808 validates the memory address in the MAR 642. The memory address in the MAR 642 may be invalid for a number of reasons. For example, an interrupt could have occurred between the memory address generation operation 902 and the memory load operation 910, such that the MAR 642 does not contain the memory address generated by the memory address generation operation 902 after returning from the interrupt service routine.

To validate the memory address, the controller 808 compares the source register of the current memory access operation with the destination register of the immediately preceding memory address generation operation. In the timing diagram of FIG. 9, the current memory access operation is the memory load operation 910 and the immediately preceding memory address generation operation is memory address generation operation 902. If the identities of the source register and the destination register are the same, then the memory address in the MAR 642 is valid. If the memory address in the MAR 642 is valid, then the operation of the memory load operation 910 continues as described above.

In the examples given above with reference to Statements 3 and 4, the source register of the current memory access operation (that is, memory load operation 910) is R3. The destination register of the immediately preceding memory address generation operation (that is, memory address generation operation 902) is also R3. Since the identities of the source register and the destination register are the same, the memory address in the MAR 642 is valid.

The operation of the register-to-register operation 918 is similar to the operation of the register-to-register operation 718.

The operation of the second embodiment of the present invention is further illustrated with the following example. The left column represents operations performed by the even ALU 608, and the right column indicates operations performed by the odd ALU 610.

|  | even ALU 608 | odd ALU 610 |
|---|---|---|
| i1: | R3 ← R1 + R2 |  |
| i2: | R10 ← R11 + R12 | R4 ← (R3) |
| i3: | R20 ← R21 + R22 | R5 ← (R10) |

During i2, the contents of R3 are used as a memory address to access the memory 646. Similarly, during i3, the contents of R10 are used as a memory address to access the memory 646.

As evident by the timing diagram in FIG. 9, the present invention eliminates uneven pipelines and thus write back conflicts by performing address generation in a separate operation (that is, the memory address generation operation 902).

Also, the present invention avoids long cycle times by accessing the MAR 642 for memory addresses during memory load operations rather than the GPR 606. The use of the MAR 642 in this manner ensures that the decode/memory access/comparision cycle 914 of the memory load operation 910 takes approximately the same time to complete as the decode/execute cycle 906 of the memory address generation operation 902.

Specifically, the decode/memory access/comparision cycle 914 involves (1) processing time to retrieve the memory address in the MAR 642 (the memory address was placed in the MAR 642 during the address generation operation 902), (2) memory read latency delay associated with reading data from the memory 646 according to the memory address, and (3) propagation delay to send the data from the memory 646 to the odd ALU out register 614 via line 634, bus 632, and line 636. The memory address validation process performed by the controller 808 does not increase the processing time of the decode/memory access/comparision cycle 914 since it is performed while accessing the memory 646.

The decode/execute cycle 906 involves (1) processing time to access the GPR 606 to retrieve data for the address generation operation 902, (2) processing time of the even ALU 608, and (3) propagation delay to send the memory address from the even ALU 608 to the MAR 642 via line 624, MUX 810, and line 820.

In practice, the processing time is approximately the same for both the decode/memory access/comparison cycle 914 and the decode/execute cycle 906. This is true whether or not the register-to-register operation 902 is functioning as a memory address generation operation or as a true register-to-register operation, such as operation 918.

Because the processing time is approximately the same for both the decode/memory access/comparision cycle 914 and the decode/execute cycle 906, the cycle time is optimized from a balanced pipeline partition which has no single particularly long pipeline stage. Thus, the second embodiment of the present invention eliminates write back collisions and long cycle time.

The operation of the computer subsystem 802 when the memory address in the MAR 642 is invalid will now be described with reference to the pipelined timing diagram in FIG. 10. The timing diagram in FIG. 10 shows a memory address generation operation 1002 starting at $t_0$, a memory load operation 1010 starting at $t_1$, and a register-to-register operation 1020 starting at $t_3$.

The operation of the memory address generation operation 1002 is similar to the operation of the memory address generation operation 902.

The operation of the memory load operation 1010 is similar to the operation of the memory load operation 910. However, if during a decode/memory access/comparison cycle 1014 the controller 808 determines that the memory address in the MAR 642 is invalid, then data is not transferred from the memory 646 to the odd ALU out register 614 (alternatively, data is transferred to the odd ALU out register 614 but is then discarded).

Instead, the controller 808 loads the MAR 642 with the correct memory address for the memory load operation 1010. The controller 808 does this by accessing the GPR 606 for the correct memory address as specified by the memory load operation 1010. The controller 808 then transfers the memory address from the GPR 606 to the MAR 642 via lines 812, 814, 820 by switching the MUX 810 to line 814.

Figure 10:
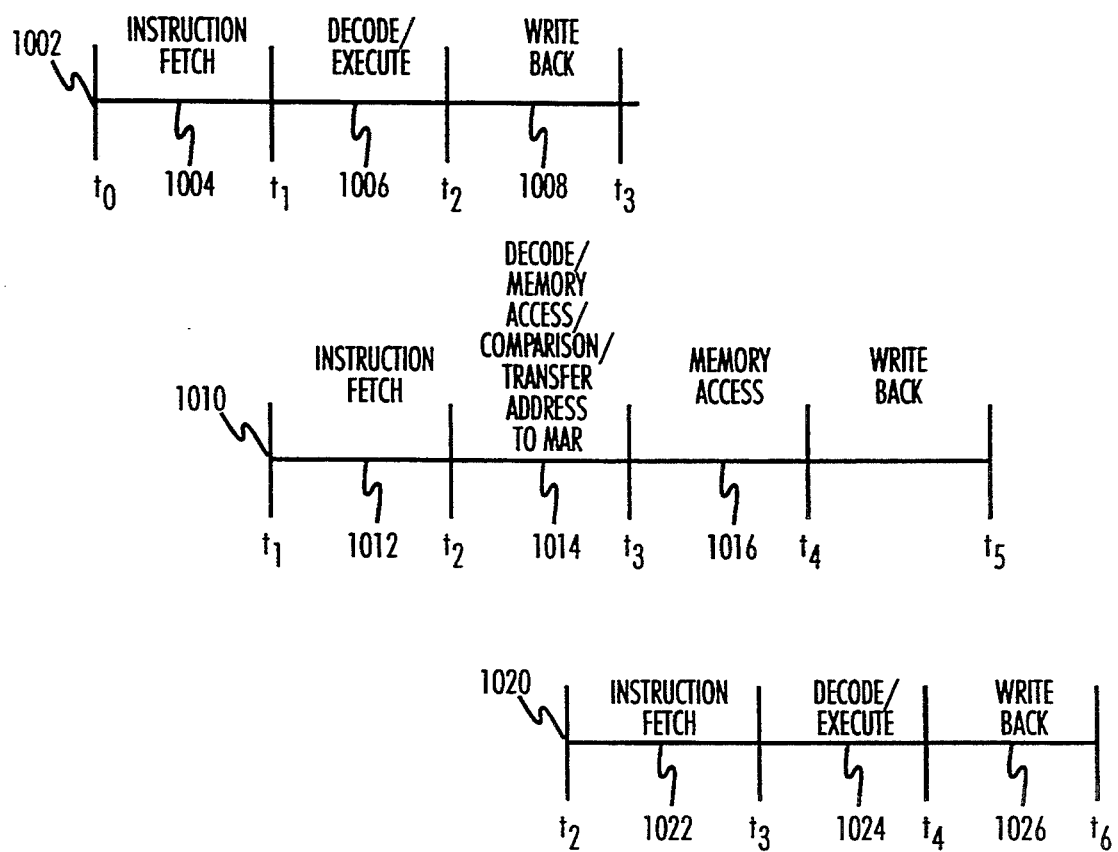
FIG. 10 illustrates a second pipelined timing diagram for the second embodiment of the present invention.

As indicated in FIG. 10, the controller 808 loads the MAR 642 during the decode/memory access/comparison cycle 1014 when the memory address in the MAR 642 is invalid. Loading the MAR 642 does not appreciably increase the processing time of the decode/memory access/comparision cycle 1014 since it is performed while accessing the memory 646.

When the memory address in the MAR 642 is invalid, the memory load operation 1010 requires an additional cycle to access the memory 646. This additional cycle is shown in FIG. 10 as a memory access cycle 1016. During the memory access cycle 1016, the memory address in the MAR 642 is used to access and retrieve data from the memory 646. The data is transferred to the odd ALU out register 614 via line 634, bus 632, and line 636.

During a write back cycle 1018, the data in the odd ALU out register 614 is written back to one of the GPRs 606 via line 638 as specified by the memory load operation 1010.

Because it requires an additional cycle, the memory load operation 1010 is called an extended cycle operation. The computer subsystem 802 is in an extended operational mode when using extended cycle operations. For analogous reasons, the memory load operation 910 is called a normal cycle operation. The computer subsystem 802 is in a normal operational mode when using normal cycle operations. As described above, the computer subsystem 802 operates in the normal operational mode when the memory address in the MAR 642 is valid. The computer system 802 operates in the extended operational mode when the memory address in the MAR 642 is invalid.

The operation of the register-to-register operation 1020 is similar to the operation of the register-to-register operation 918. As shown in FIG. 10, however, the register-to-register operation 1020 starts two cycles after the memory load operation 1010 (instead of one cycle). A state machine (not explicitly shown in FIG. 8) controls the invocation of operations such that register-to-register operations start two cycles after extended cycle operations. The state machine may be part of the controller 808.

As evident by the timing diagram in FIG. 10, the present invention eliminates write back collisions and avoids long cycle time by accessing the MAR 642 for memory addresses during memory load operations. The use of the MAR 642 in this manner ensures that the decode/memory access/comparision cycle 1014, the memory access cycle 1016, and the decode/execute cycle 1024 take approximately the same time to process (the discussion above regarding the processing times of the decode/memory access/comparison cycle 914 and the decode/execute cycle 906 is generally valid for these cycles). Because the processing time is approximately the same for these three cycles, the pipeline partition is balanced. Thus, the second embodiment of the present invention eliminates write back collisions and avoids long cycle time.

As shown in FIG. 10, extended cycle operations effectively take two cycles to operate. Thus, the second embodiment of the present invention is more efficient while in normal operational mode than while in extended operational mode. However, the computer subsystem 802 is more often operating in the normal operational mode than in the extended operational mode (if compilers schedule correctly by placing address generation operations right before memory load operations and use the appropriate functional units). Thus, the second embodiment of the present invention eliminates write back collisions without degrading overall system performance.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A computer system comprising:
   (1) first registers for storing data;
   (2) a second register for storing memory addresses, said second register being architecturally visible such that said second register must be explicitly specified in user-associated instructions to cause memory addresses to be stored in said second register during memory address generation operations;
   (3) arithmetic-logic means coupled to said first registers for generating said memory addresses from said data during said memory address generation operations; and
   (4) means coupled to said arithmetic-logic means for writing back said memory addresses to said first registers during said memory address generation operations, and for storing said memory addresses in said second register during said memory address generation operations when said second register is explicitly specified in said user-associated instructions.

2. The computer system of claim 1, further comprising:

(5) a memory coupled to said second register;
(6) means for retrieving said memory addresses from said second register during memory access operations; and
(7) means for accessing said memory by using said retrieved memory addresses during said memory access operations.

3. The computer system of claim 2, wherein said first registers and arithmetic-logic means are located on a first circuit board and said second register and memory are located on a second circuit board.

4. The computer system of claim 1, further comprising:
(5) means for saving machine states by transferring said memory addresses in said second register to said first registers.

5. The computer system of claim 1, wherein an output of said first register is coupled to an input of said arithmetic-logic means.

6. A computer-based method for accessing a memory, said method for use in a computer system comprising first registers and a second register, the second register being architecturally visible such that the second register must be explicitly specified in user-associated instructions to cause memory addresses to be stored in said second register, said method comprising the steps of:
(a) generating a memory address during a memory address generation operation;
(b) writing back said memory address to the first registers during said memory address generation operation, and storing said memory address in said second register during said memory address generation operation when the second register is explicitly specified in a user-associated instruction associated with said memory address generation operation;
(c) retrieving said memory address from said second register during a memory access operation; and
(d) accessing the memory using said retrieved memory address during said memory access operation.

7. The method of claim 6, further comprising the step of saving machine states by transferring said memory addresses in said second register to said first registers.

8. The method of claim 6, wherein said first registers are located on a first circuit board and said second register and memory are located on a second circuit board.

9. A computer system comprising:
(1) first registers for storing data and memory addresses;
(2) a second register for storing said memory addresses;
(3) arithmetic-logic means coupled to said first registers for generating said memory addresses from said data during memory address generation operations;
(4) means coupled to said arithmetic-logic means for writing back said memory addresses to said first registers and storing said memory addresses in said second register during said memory address generation operations;
(5) control means for validating said second register during memory access operations, wherein said second register is valid when said second register contains a valid memory address to access a memory during a memory access operation; and
(6) a multiplexer coupled to said first registers, second registers, and arithmetic-logic means for transferring said memory addresses from said first registers to said second register during said memory access operations if said second register is invalid, wherein said second register is invalid when said second register does not contain a valid memory address to access a memory during a memory access operation.

10. The computer system of claim 9, further comprising:
(6) a memory coupled to said second register for storing said data;
(7) means for retrieving said memory addresses from said second register during said memory access operations; and
(8) means for accessing said memory by using said retrieved memory addresses during said memory access operations.

11. The computer system of claim 10, wherein said means for accessing said memory by using said retrieved memory addresses during said memory access operations comprises means for retrieving said data from said memory.

12. The computer system of claim 11, further comprising means for writing back said retrieved data to said first registers during said memory access operations if said second register is valid.

13. The computer system of claim 10, wherein said first registers and arithmetic-logic means are located on a first circuit board and said second register and memory are located on a second circuit board.

14. The computer system of claim 9, wherein said control means comprises means for determining if said second register contains a valid memory address to access a memory during said memory access operation.

15. The computer system of claim 14, wherein said means for determining comprises:
first means for determining a source register identification of a current memory access operation;
second means for determining a destination register identification of an immediately preceding memory address generation operation; and
means for comparing said source register identification and destination register identification to determine if said second register is valid, wherein said second register is valid if said source register identification and destination register identification are equal.

16. The computer system of claim 15, wherein said first registers comprise said source register and destination register.

17. The computer system of claim 9, wherein an output of said first register is coupled to an input of said arithmetic-logic means.

18. A computer-based method for accessing a memory, wherein the memory contains data, the method comprising the steps of:
(a) generating a memory address during a memory address generation operation;
(b) writing back said memory address to first registers and storing said memory address in a second register during said memory address generation operation; and
(c) validating said second register during a memory access operation, wherein said second register is valid when said second register contains a valid memory address to access the memory during said memory access operation;

(d) retrieving said memory address from said second register during said memory access operation when said second register is valid; and (e) accessing the memory by using said retrieved memory address during said memory access operation;

step (c) comprising the steps of:

(i) determining a source register identification of a current memory access operation, (ii) determining a destination register identification of an immediately preceding memory address generation operation, (iii) comparing said source register identification and destination register identification to determine if said second register is valid, and (iv) transferring a valid memory address contained in said first registers to said second register if said second register is invalid.

19. The method of claim 18, wherein step (e) comprises the step of retrieving the data from the memory.

20. The method of claim 19, further comprising the step of writing back said retrieved data to said first registers during said memory access operation if said second register is valid.

21. The method of claim 18, wherein said first registers comprise said source register and destination register.

22. The method of claim 18, wherein said first registers are located on a first circuit board and said second register and memory are located on a second circuit board.

23. The method of claim 18, wherein said first registers and second register are architecturally distinct.

24. A computer system comprising:

(1) first registers for storing data and memory addresses;

(2) a second register for storing said memory addresses;

(3) a memory coupled to said second register for storing data;

(4) arithmetic-logic means coupled to said first registers for generating said memory addresses from said data during memory address generation operations;

(5) means coupled to said arithmetic-logic means for writing back said memory addresses to said first registers and storing said memory addresses in said second register during said memory address generation operations;

(6) control means for validating said second register during memory access operations, said control means comprising means for determining if said second register contains valid memory addresses to access said memory during said memory access operations, said means for determining comprising:

(a) means for determining a source register identification of a current memory access operation;

(b) means for determining a destination register identification of an immediately preceding memory address generation operation; and (c) means for comparing said source register identification and destination register identification to determine if said second register is valid, wherein said second register is valid if said source register identification and destination register identification are equal;

(7) a multiplexer coupled to said first registers, second register, and arithmetic-logic means for transferring said memory addresses from said first registers to said second register during said memory access operations if said second register is invalid;

(8) means for retrieving said memory addresses from said second register during said memory access operations; and (9) means for accessing said memory by using said retrieved memory addresses during said memory access operations.

25. The computer system of claim 24, wherein said means for accessing said memory by using said retrieved memory addresses during said memory access operations comprises means for retrieving said data from said memory.

26. The computer system of claim 25, further comprising means for writing back said retrieved data to said first registers if said second register is valid.

27. The computer system of claim 24, wherein said first registers and arithmetic-logic means are located on a first circuit board and said second register and memory are located on a second circuit board.

28. The computer system of claim 24, wherein said first registers comprise said source register and destination register.

29. The computer system of claim 24, wherein an output of said first register is coupled to an input of said arithmetic-logic means.

30. A computer-based method for accessing a memory, wherein the memory contains data, the method comprising the steps of:

(a) generating a memory address during a memory address generation operation;

(b) writing back said memory address to first registers and storing said memory address in a second register during said memory address generation operation;

(c) validating said second register during a memory access operation, said step for validating comprising the step of determining if said second register contains a valid memory address to access the memory during said memory access operation, said step of determining comprising the steps of:

(1) determining a source register identification of a current memory access operation;

(2) determining a destination register identification of an immediately preceding memory address generation operation;

(3) comparing said source register identification and destination register identification to determine if said second register is valid, wherein said second register is valid if said source register identification and destination register identification are equal; and (4) transferring a valid memory address contained in said first registers to said second register if said second register is invalid;

(d) retrieving said memory address from said second register during said memory access operation; and (e) accessing the memory by using said retrieved memory address during said memory access operation.

31. The method of claim 30, wherein step (e) comprises the step of retrieving the data from the memory.

32. The method of claim 31, further comprising the step of writing back said retrieved data to said first registers during said memory access operation if said second register is valid.

33. The method of claim 30, wherein said first registers comprise said source register and destination register.

34. The method of claim 30, wherein said first registers are located on a first circuit board and said second register and memory are located on a second circuit board.

35. The method of claim 30, wherein said first registers and second register are architecturally distinct.

* * * * *

UNITED STATES PATENT AND TRADEMARK OFFICE
CERTIFICATE OF CORRECTION

PATENT NO. : 5,367,648
DATED : November 22, 1994
INVENTOR(S) : Chiao-Mei Chuang, et al.

It is certified that error appears in the above-indentified patent and that said Letters Patent is hereby corrected as shown below:

On the title page, item [75]: Inventors, second inventor should read --Kemal Ebcioglu--.

Signed and Sealed this

Twenty-second Day of August, 1995

Attest:

BRUCE LEHMAN

Attesting Officer     Commissioner of Patents and Trademarks